(12) United States Patent
Sharper

(10) Patent No.: US 6,817,743 B2
(45) Date of Patent: Nov. 16, 2004

(54) VEHICLE WHEEL ILLUMINATION SYSTEM

(76) Inventor: Allen Sharper, 1108 Greentree Ct., Tallahassee, FL (US) 32304

( * ) Notice: Subject to any disclaimer, the term of this patent is extended or adjusted under 35 U.S.C. 154(b) by 0 days.

(21) Appl. No.: 10/352,411

(22) Filed: Jan. 28, 2003

(65) Prior Publication Data

US 2003/0169596 A1 Sep. 11, 2003

Related U.S. Application Data

(60) Provisional application No. 60/351,461, filed on Jan. 28, 2002.

(51) Int. Cl.[7] ................................................. B60Q 1/32
(52) U.S. Cl. ........................ 362/500; 362/183; 362/506; 362/549
(58) Field of Search ............................... 362/500, 368, 362/543, 544, 473, 228, 183, 549, 506, 495

(56) References Cited

U.S. PATENT DOCUMENTS

| | | | |
|---|---|---|---|
| 2,786,935 A | * | 3/1957 | Geary .......................... 362/506 |
| 3,017,500 A | | 1/1962 | Pezzopane |
| 4,070,594 A | * | 1/1978 | Fuchi et al. .................... 313/1 |
| 4,729,074 A | * | 3/1988 | Steadman .................... 362/148 |
| 4,802,069 A | | 1/1989 | Chandler |
| 4,894,755 A | | 1/1990 | Chandler |
| 5,040,100 A | | 8/1991 | Di Gaetano |
| 5,454,511 A | * | 10/1995 | Van Ostrand et al. ..... 236/46 R |
| 5,548,274 A | | 8/1996 | Anderson et al. |
| 5,573,686 A | | 11/1996 | Lavicska |
| 5,644,207 A | * | 7/1997 | Lew et al. .................... 320/101 |
| 5,682,138 A | | 10/1997 | Powell et al. |
| 6,176,603 B1 | | 1/2001 | Spicer |
| 6,220,733 B1 | | 4/2001 | Gordon |

* cited by examiner

Primary Examiner—Alan Cariaso
Assistant Examiner—Mark Tsidulko
(74) Attorney, Agent, or Firm—John D Gugliotta; Olen L. York, III

(57) ABSTRACT

A vehicle wheel illumination system is a device having four separate light assemblies that are affixed above a tire and within the wheel well above the respective tire. Each light assembly includes a housing formed from a base, a wall and a cap that is removable. The base houses the electrical wiring that is coupled with a bulb stem. A bulb is inserted into the bulb stem to provide illumination. The cap includes a translucent lens through which the illuminated bulb is transmitted. The housing further includes mounting means for attaching the housing to the wheel well. The electrical wiring is further coupled to the electrical system of the automobile.

19 Claims, 5 Drawing Sheets

VEHICLE WHEEL ILLUMINATION SYSTEM

RELATED APPLICATIONS

The present invention was first described in Disclosure Document Registration 494,545 filed on Jun. 1, 2001 under 35 U.S.C. §122, 37 C.F.R. §1.14 and MPEP § 1706.

The present invention is a continuation of U.S. Provisional Patent No. 60/351,461, filed on Jan. 28, 2002.

BACKGROUND OF THE INVENTION

1. Field of the Invention

The present invention relates generally to wheels for automotive vehicles and, more particularly, to a system of stylistically enhancement of vehicle wheels by illumination.

2. Description of the Related Art

The love affair people have with their automobiles is a well-known. Countless hours are spent cleaning, waxing, and detailing cars all around the world ever day, just so they can look their best as they drive. Many people also go to extra lengths to draw attention to their car. This is evidenced by the great popularity of custom paint schemes, custom wheels, and even special neon lights located on the bottom of the car or around the license plate. However, as more and more people utilize these devices to draw attention, the novelty wears off, and they just become non-distinct. Accordingly, there exists a continual need for devices that provide a custom look for motor vehicles and which provide an attention-gathering factor.

A search of the prior art did not disclose any patents that read directly on the claims of the instant invention; however, the following references were considered related:

U.S. Pat. No. 6,220,733, issued in the name of Gordon, discloses a vehicle wheel lighting system comprising a light source, a reflective body and an electrical power source operably coupled to the light source, wherein light is directed onto the reflective body so as to accentuate the wheels;

U.S. Pat. No. 6,176,603, issued in the name of Spicer, discloses a wheel lighting system comprising an annular light source and a tubular cover substantially covering the light source, wherein the lighting system lights from behind the wheel;

U.S. Pat. No. 5,682,138, issued in the name of Powell et al., discloses an illumination system for a semi-trailer that illuminates the rear wheel assembly for a predetermined period of time in response to actuation of the turn signal;

U.S. Pat. No. 5,573,686, issued in the name of Lavicska, discloses a lamp or heater for a wheel well of a motor vehicle comprising an arcuate member for protecting the wheel well from stone, salt and moisture damage, and further comprising a light and heat mechanism for providing light and warmth for purposes of assisting a motorist in changing a tire;

U.S. Pat. No. 5,548,274, issued in the name of Anderson et al., discloses a strobe light for a vehicle tire and wheel for providing light in an insufficiently lit area;

U.S. Pat. No. 5,040,100, issued in the name of DiGaetano, discloses a vehicle wheel well illumination device comprising a pair of light sources and a resilient rod interconnecting the light sources in a spaced apart configuration;

U.S. Pat. No. 4,894,755, issued in the name of Chandler, discloses retractable tire change lights for a motor vehicle comprising four lights, each mounted near the wheel well above each individual tire;

U.S. Pat. No. 4,802,069, issued in the name of Chandler, discloses retractable tire change lights for a motor vehicle comprising four lights, each mounted near the wheel well above each individual tire; and U.S. Pat. No. 3,017,500, issued in the name of Pezzopane, discloses a vehicle lamp disposed within the wheel well of a motor vehicle.

Consequently, a need has been felt for providing an apparatus that improves spot illumination of wheels of a motor vehicle.

SUMMARY OF THE INVENTION

It is therefore an object of the present invention to provide an improved vehicle wheel illumination system.

It is a feature of the present invention to provide an improved vehicle wheel illumination system having a waterproof housing fixedly attached to the surface of a wheel well of an automobile.

It is a further feature of the present invention to provide an improved vehicle wheel illumination system having a translucent lens threadably attached to the housing in a removable manner.

It is still a further feature of the present invention to provide an improved vehicle wheel illumination system having at least one light bulb for providing illumination to the wheels of an automobile.

It is still a further feature of the present invention to provide an improved vehicle wheel illumination system having a pair of bulbs for providing illumination and aesthetic characteristics to the wheels of an automobile.

Briefly described according to one embodiment of the present invention, a vehicle wheel illumination system is a device having four separate light assemblies, each light assembly separately affixed above each separate tire and within the wheel well above each respective tire. Each light assembly includes a housing formed from a base, a wall and a cap that is removable. The base houses the electrical wiring that is coupled with a bulb stem. A bulb is inserted into the bulb stem to provide illumination. The cap includes a translucent lens through which the illuminated bulb is transmitted. The housing further includes mounting means for attaching the housing to the wheel well. The electrical wiring is further coupled to the electrical system of the automobile.

An advantage of the present invention is that it is manufactured from inexpensive, yet durable, materials intended to provide a cost effective device that is easily installed and maintained.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
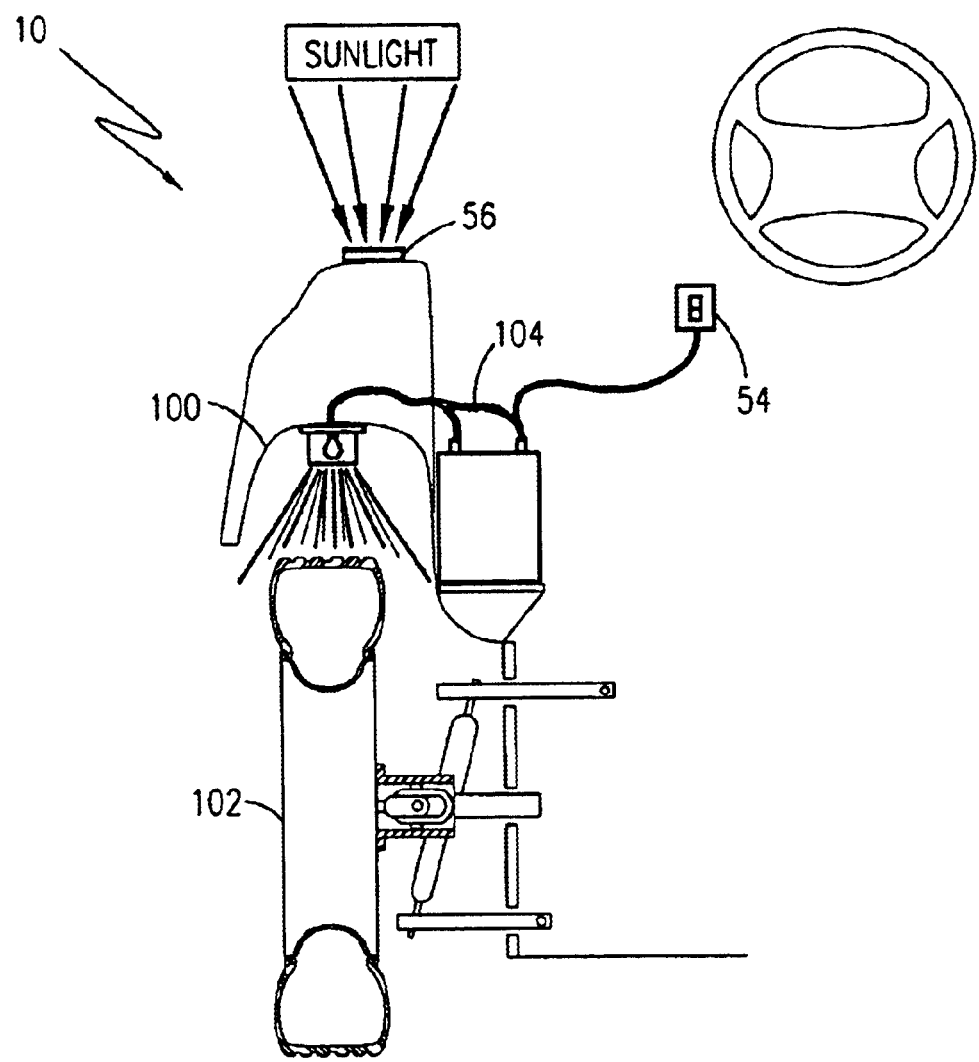
FIG. 1 is a front view and partial section of the vehicle wheel illumination system, wherein a light assembly and housing is mounted to the surface of a wheel well just above a tire, and wherein the light assembly is operably and electrically coupled with the electrical System of the automobile.

The best mode for carrying out the invention is presented in terms of its preferred embodiment, herein depicted within the FIGS. 1 through 6.

Detailed Description of the Figures

Referring now to FIG. 1 through FIG. 7, a vehicle wheel illumination system 10 is shown in accordance with a preferred embodiment of the present invention. The system 10 comprises four individual light assemblies 12, 14, 16 and 18 that are each separately mounted to an interior surface of each individual fender (wheel well) 100 over each individual tire 102. Each light assembly 12, 14, 16 or 18 utilizes a light source 20, envisioned to be of a low-wattage incandescent bulb 20a. Other illumination sources, such as noon black light, or colored lights 20b, may also be used separately to or in combination with in incandescent bulb 20a. The light source 20 is housed within a waterproof housing 22 with a sealed translucent lense 24 and a mounting means 26 for fastening each light assembly 12, 14, 16 or 18 to a respective fender 100. The wiring harness 28, one from each housing 22 at each tire 102, is routed through the interior of the car and is connected together in a parallel circuit and then operably coupled to a fused switch 54 located at the driver's seat, where it is further connected to the vehicle electrical system 104. The incorporation of a solar power converter 56 is anticipated to power the light source 20 in the event of battery failure or incapacitation.

Each light assembly 12, 14, 16 or 18, further distinguished as a first light assembly 12, a second light assembly 14, a third light assembly 16 or a fourth light assembly 18, comprises a waterproof housing 22 that includes a base 30, a wall 32 depending from the base 30, and a cap 34. The base 30 includes a bulb stem 36 for receiving a light bulb 20a or 20b. The base 30 further includes an orifice 38 for ingress and egress of electrical wiring 40 necessary to operably couple the system 10 to the electrical circuitry of an automobile. The base 30 further includes mounting means 26 for attachment of the housing 22 to the wheel well of the automobile. The wall 32 depends from the base 30 and forms a volume 42 in which a light bulb(s) 20a or 20b may be inserted and housed. An opening 44 is formed at an end opposite to the base 30 to provide access to the light bulb(s) 20a or 20b. The wall 32 is envisioned and anticipated as having a variety of possible configurations, including a conical shape and a cylindrical shape among others. Near the opening 44, external threads 46 circumscribe the circumference 48 of the opening 44. A cap 34 threadably attaches to the housing 22 as the internal threads 50 circumscribe a lip 52 of the cap 34 are threadably matched to the external threads 46 of the housing 22. The cap 34 includes a translucent lens 24 through which the illuminated light bulb(s) 20a or 20b is transmitted. The lens 24 may be of glass or plastics, including poly(methyl methacrylates), such as PLEXI-GLAS® and LUCITE®, acrylic resins, such as ACRYLIC®, polycarbonate (lexan) or other suitable materials.

Figure 6:
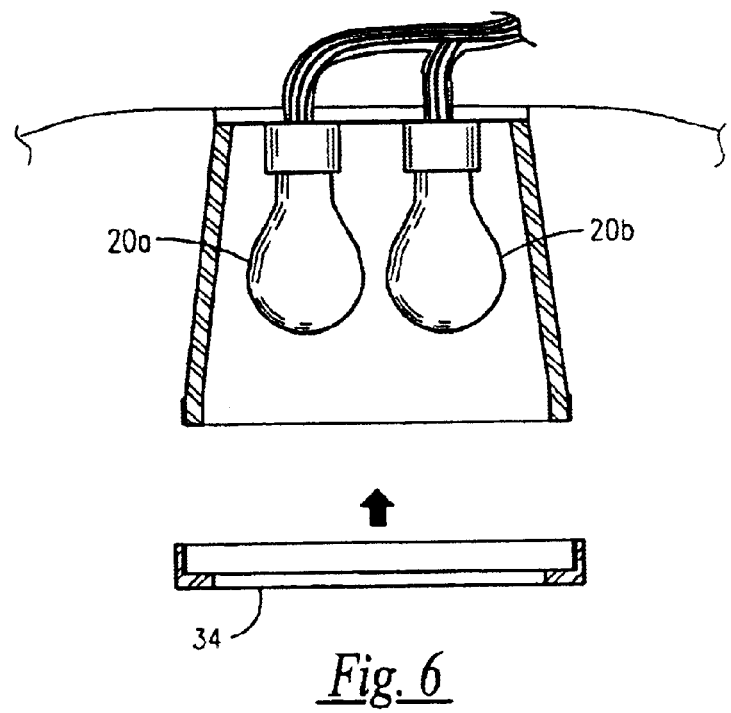
FIG. 6 is an alternative embodiment shown in section of a two-bulb device.
Figure 7:
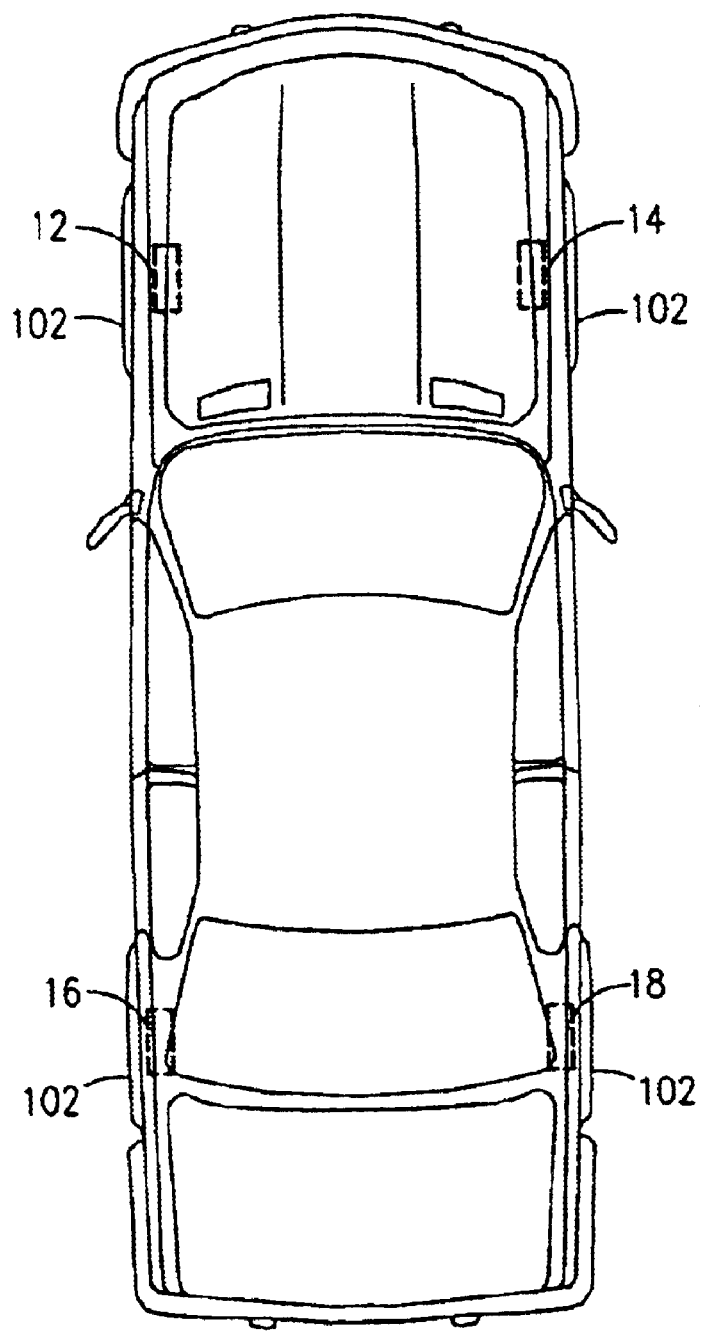
FIG. 7 is a ton view of a vehicle having four separate light assemblies separately mounted to the respective wheel wells over each of the four tires.

In one embodiment of the present invention, the system 10 includes a pair of light bulbs 20a or 20b (as best seen in FIG. 6). The pair of light bulbs 20a or 20b may comprise two incandescent bulbs, two alternative bulbs, or a combination of one incandescent bulb and one alternative bulb. It is envisioned that the combination of one incandescent bulb and one alternative bulb (neon, black light or colored bulb) provides versatility to the system 10 in that the alternative bulb provides ground effects and aesthetic lighting to the tires of the vehicle, while the incandescent bulb provides a functional light source when maintenance or emergency situations require such lighting. In a two-bulb or three-bulb configuration, a switch 54 is included to provide a mechanism for changing the illumination of the bulbs from aesthetic to functional and vice versa. The switch 54 is envisioned as being located within the interior of the automobile with indicia to indicate a mode of operation. However, it is also envisioned that the switch 54 may be located on the exterior surface of the wall 32 of the housing 22, with indicia to indicate the mode of operation that the switch 54 is set to.

Optionally, a solar power converter 56 is included to provide an additional source of electrical energy. The solar power converter 56 absorbs, converts and stores solar energy and supplies electrical energy to either the automobile battery or directly to the light assemblies 12, 14, 16 or 18 via electrical coupling. The incorporation of a solar power converter 56 is anticipated to provide power to the light assemblies 12, 14, 16 or 18 in the event of, and despite, failure of the automobile battery. Therefore, and only as an example, the failure of the automobile battery would not prevent the light assemblies 12, 14, 16 or 18 from illuminating the tires and wheel well, thereby allowing a user to successfully and safely remove a damaged tire and affixing a suitable replacement tire.

Figure 2:
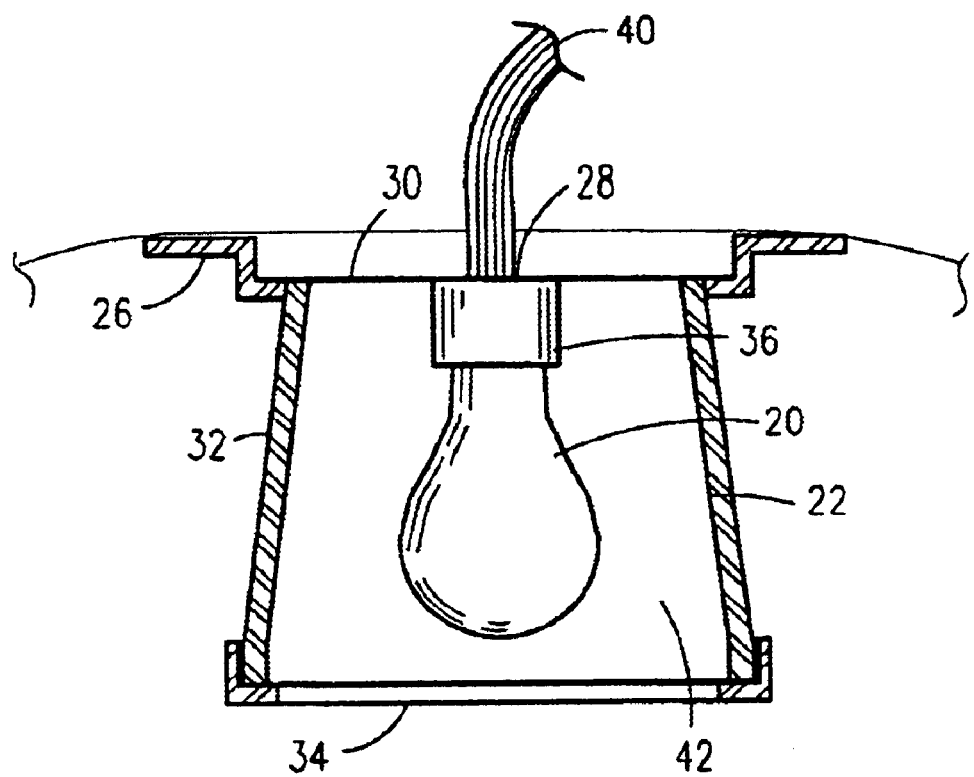
FIG. 2 is a sectional view of a light assembly and housing, wherein the housing includes a pair of mounting wings for attaching the housing to the wheel well.
Figure 3:
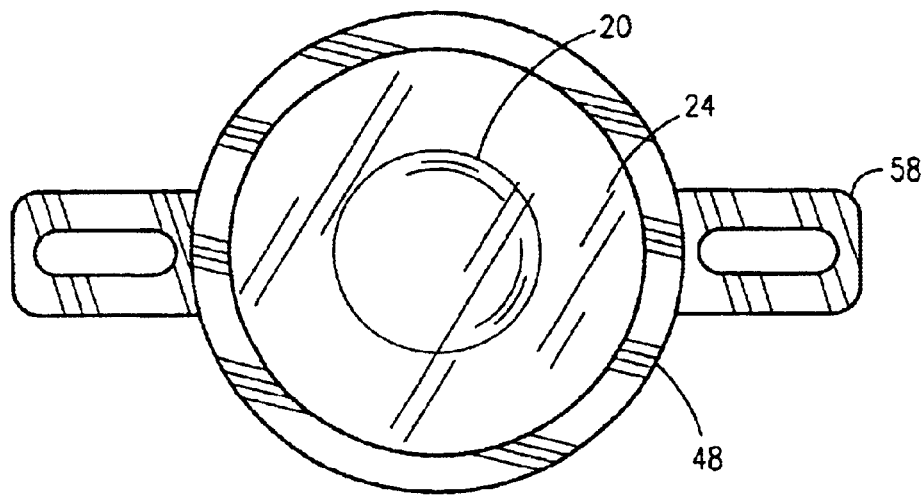
FIG. 3 is a top view of the housing, illustrating the relationship of the mounting wings to the housing, and also illustrating the translucent lens.
Figure 4:
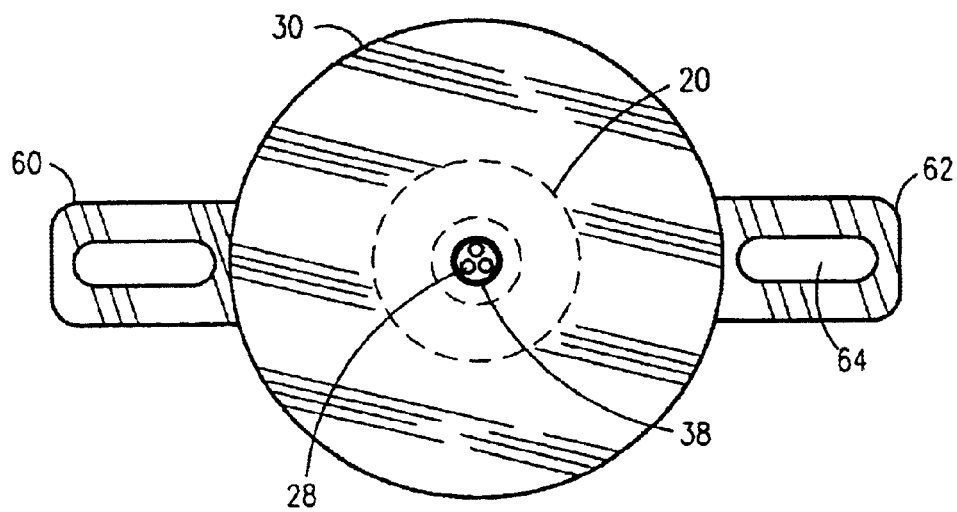
FIG. 4 is a bottom view of the housing, illustrating the light bulb and the bulb stem in phantom lines.
Figure 5:
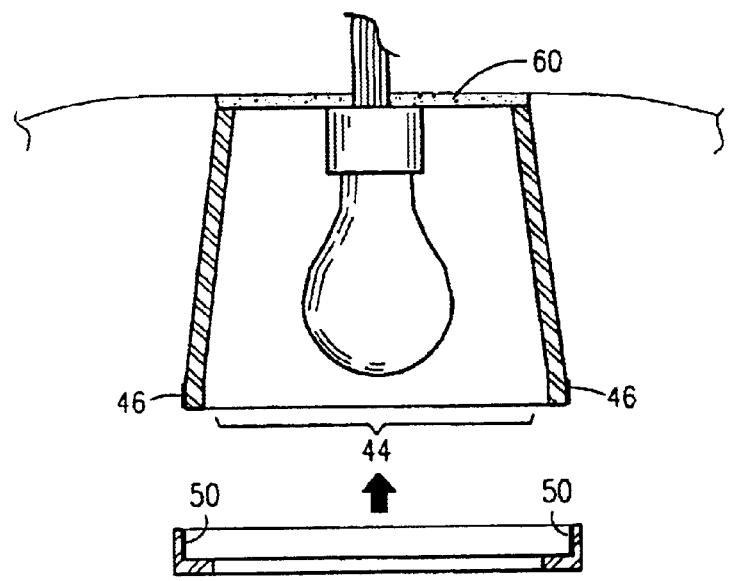
FIG. 5 is an alternative embodiment wherein an industrial adhesive serves as mounting means of the housing to the wheel well.

The mounting means 26 may have several embodiments, including the use of a bracket 58 (as shown in FIG. 2), adhesives 66 (such as industrial strength glue or epoxy resins), magnets, clamps or gravitational impingement of the housing 22 through a hole drilled within the wheel well. The bracket 58 includes at least a pair of mounting wings 60 and 62, wherein each mounting wing 60 and 62 includes an elongated aperture 64 for receiving attachment means (such as a bolt, screw, nail or other appropriate means). The bracket 58 is aligned within the wheel well and secured thereto via attachment means. Likewise, an adhesive 66 provided with the system 10, or sold separately, may be applied to the surface of the wheel well and the exterior surface of the base 30, and the housing 22 securely affixed to the wheel well via the adhesive. Furthermore, a magnet may be used in which the magnet is integrally affixed to the surface of the housing 22 and provides sufficient magnetic attraction to securely affix the housing 22 to the wheel well. Yet another method of attachment includes permanent welding of the housing 22 to the wheel well forming a permanent seam. Finally, a hole may be drilled through the wheel well to accommodate the housing 22, thereby securely holding the housing 22 via gravitational impingement of the perimeter of the hole to the sides of the wall 32 of the housing 22.

Operation of the Preferred Embodiment

To use the present invention, a user will install each light assembly 12, 14, 16 and 18 within the wheel well 100 above each tire 102 on the automobile. Installation includes using the provided mounting means 26 (bracket 58 or other disclosed means) for affixing each light assembly 12, 14, 16 and 18 to the surface of the wheel well 100. Once each light assembly 12, 14, 16 and 18 is affixed, the wiring harness 28 of each respective light assembly 12, 14, 16 and 18 is electrically coupled with the electrical system of the automobile. The desired coloration of the light source 20 (incandescent bulb versus colored bulbs) is chosen and installed within the housing 22. The user may then choose the effects in a specified manner.

The foregoing descriptions of specific embodiments of the present invention have been presented for purposes of illustration and description, and are not intended to be exhaustive or to limit the invention to the precise forms disclosed. Obviously, many modifications and variations are possible in light of the above teaching. The embodiments were chosen and described in order to best explain the principles of the invention and its practical application, and to enable others skilled in the art to best utilize the invention and various embodiments with various modifications as are suited to the particular use contemplated. It is intended that the scope of the invention be defined by the claims appended hereto and their equivalents. Thus, the invention is to be limited only by the following claims.

What is claimed is:

1. A vehicle wheel illumination system comprising: four light assemblies, each one of said light assemblies separately mounted within a fender over each respective tire, each said light assembly comprising a light source housed within a waterproof housing;

said housing comprises
a base comprising an orifice for ingress and egress of electrical wiring to at least one bulb stem, said bulb stem receiving a light bulb;
a wall depending from said base, said wall comprising external threads about a circumference of an opening formed opposite to said base; and
a cap comprising a lip having internal threads about a circumference of said lip, said cap further comprising a translucent lens integral to said lip and provided to transmit light emanating from said light bulb, said cap threadably coupled to said wall about said opening, a plurality of wiring harnesses, each one of said wiring harnesses electrically coupled between said light assemblies and the electrical circuitry of an automobile; and mounting means provided for affixing each of said light assemblies to said fender.

2. The vehicle wheel illumination system of claim 1, wherein said mounting means comprises a pair of brackets formed about an exterior of said, said pair of brackets including an elongated aperture formed therein for receiving of attachment means.

3. The vehicle wheel illumination system of claim 1, wherein said mounting means comprises an industrial adhesive applied to said base to affix said base and said housing to said fender.

4. The vehicle wheel illumination system of claim 1, wherein said mounting means comprises a permanent seam formed by welding of said housing to said fender.

5. The vehicle wheel illumination system of claim 1, further comprising a mode switch for indicating and permitting alteration in made operation of said light assemblies.

6. The vehicle wheel illumination system of claim 1, further comprising a solar power converter for absorbing, storing and converting solar energy into electrical energy used by said light assemblies.

7. A vehicle wheel illumination system comprising:

four light assemblies, each of said light assemblies separately mounted within a fender over each respective tire, each said light assembly comprising a light source housed within a waterproof housing;

said housing comprises
a base comprising an orifice for ingress and egress of electrical wiring to at least one bulb stem, said bulb stem receiving a light bulb;
a wall depending from said base, said wall comprising external threads about a circumference of an opening formed opposite to said base;
said base and said wall form a volume into which said light bulb is received and housed; and
a cap comprising a lip having internal threads about a circumference of said lip, said cap further comprising a translucent lens integral to said lip and provided to transmit light emanating from maid light bulb, said cap threadably coupled to said wall about said opening;

a plurality of wiring harnesses, each one of said wiring harnesses electrically coupled between said light assemblies and the electrical circuitry of an automobile; and mounting means provided for affixing each of said light assemblies to said fender.

8. The vehicle wheel illumination system of claim 7, wherein said translucent lens is a member selected from the group consisting of glass, poly (methyl methacrylates), acrylic resins and polycarbonates.

9. The vehicle wheel illumination system of claim 7, wherein said mounting means comprises a pair of brackets formed about an exterior of said base, said pair of brackets including an elongated aperture formed therein for receiving of attachment means.

10. The vehicle wheel illumination system of claim 7, wherein said mounting means comprises an industrial adhesive applied to said base to affix said base and said housing to said fender.

11. The vehicle wheel illumination system of claim 7, wherein said mounting means comprises a permanent seam formed by welding of said housing to said fender.

12. The vehicle wheel illumination system of claim 7, further comprising a mode switch for indicating and permitting alteration in mode operation of said light assemblies.

13. The vehicle wheel illumination system of claim 7, farther comprising a solar power converter for absorbing, storing and converting solar energy Into electrical energy used by said light assemblies.

14. A vehicle wheel illumination system comprising:

four light assemblies, each of said light assemblies separately mounted within a fender over each respective tire, each said light assembly comprising a light source housed within a waterproof housing;

said housing comprises
a base comprising an orifice for ingress and egress of electrical wiring to at least one bulb stem, said bulb stem receiving a light bulb;
a wall depending from said base, said wall comprising external threads about a circumference of an opening formed opposite to said base; and
a cap comprising a lip having internal threads about a circumference of said lip, said cap further comprising a translucent lens integral to said lip and provided to transmit light emanating from maid light bulb, said cap threadably coupled to said wall about said opening;

said translucent lens is a member selected from the group consisting of glass, poly (methyl methacrylates), acrylic resins and polycarbonates;

a plurality of wiring harnesses, each one of said wiring harnesses electrically coupled between said light assemblies and the electrical circuitry of an automobile; and mounting means provided for affixing each of said light assemblies to said fender.

15. The vehicle wheel illumination system of claim 14, wherein said mounting means comprises a pair of brackets formed about an exterior of said base, said pair of brackets including an elongated aperture formed therein for receiving of attachment means.

16. The vehicle wheel illumination system of claim 14, wherein said mounting means comprises an industrial adhesive applied to said base to affix said base and said housing to said fender.

17. The vehicle wheel illumination system of claim 14, wherein said mounting means comprises a permanent seam formed by welding of said housing to said fender.

18. The vehicle wheel illumination system of claim 14, further comprising a mode switch for indicating and permitting alteration in mode operation of said light assemblies.

19. The vehicle wheel illumination system of claim 14, further comprising a solar power converter for absorbing, storing and converting solar energy into electrical energy used by said light assemblies.

* * * * *